United States Patent [19]

Kohno et al.

[11] Patent Number: 4,613,441
[45] Date of Patent: Sep. 23, 1986

[54] THERMOPLASTIC RESIN POROUS MEMBRANE HAVING AN INCREASED STRENGTH FACTOR

[75] Inventors: Mitsuo Kohno; Shigeki Katayama; Kazuo Matsuda, all of Yokohama, Japan

[73] Assignee: Asahi Kasei Kogyo Kabushiki Kaisha, Osaka, Japan

[21] Appl. No.: 486,915

[22] Filed: Apr. 20, 1983

Related U.S. Application Data

[63] Continuation of Ser. No. 261,913, May 5, 1981, abandoned.

[30] Foreign Application Priority Data

May 15, 1980 [JP] Japan .................................. 55-63342

[51] Int. Cl.$^4$ ............................................ B01D 13/04
[52] U.S. Cl. ................................. 210/500.36; 55/158
[58] Field of Search ...................... 210/500, 490, 506; 55/158; 428/220; 204/296; 422/48; 261/913

[56] References Cited

U.S. PATENT DOCUMENTS

| 3,558,764 | 1/1971 | Isaacson et al. | 264/210 |
| 3,679,538 | 7/1972 | Druin et al. | 161/139 |
| 3,953,566 | 4/1976 | Gore | 264/288 |
| 4,187,390 | 2/1980 | Gore | 174/102 R |
| 4,190,707 | 2/1980 | Doi et al. | 429/254 |
| 4,250,002 | 2/1981 | Lazarz et al. | 204/296 X |

FOREIGN PATENT DOCUMENTS 1576228 10/1980 United Kingdom ............ 210/500.2

Primary Examiner—David Sadowski
Attorney, Agent, or Firm—Armstrong, Nikaido, Marmelstein & Kubovcik

[57] ABSTRACT

A porous membrane formed of a thermoplastic resin having a critical surface tension of not higher than 35 dyn/cm and having a three-dimensional network structure is provided. Communicating pores having a porosity of at least 60% and an average pore diameter of 0.1 to 2.0 microns are formed in the porous membrane. The strength factor F defined by the following formula is at least 1 as measured in any direction: $F=A/[B(1-\alpha)]$, wherein A is the tensile strength at break of the membrane, B is the tensile strength at break of a non-porous film formed of the same resin and $\alpha$ is the porosity fraction of the membrane. The thickness of the porous membrane is 5 to 500 microns. The porous membrane is prepared by a process wherein a porous membrane formed of a thermoplastic resin having a critical surface tension of not higher than 35 dyn/cm and having a three-dimensional network structure including communicating pores having an average pore diameter of 0.05 to 1 micron with a porosity of 30 to 70%, is subjected to a space drawing operation in at least one direction at a temperature between 50° C. lower than the melting or softening point of the thermoplastic resin and 5° C. lower than the melting or softening point of the thermoplastic resin.

7 Claims, 1 Drawing Figure

THERMOPLASTIC RESIN POROUS MEMBRANE HAVING AN INCREASED STRENGTH FACTOR

This application is a continuation of U.S. Ser. No. 261,913, filed May 5, 1981, now abandoned.

BACKGROUND OF THE INVENTION

1. Field of the Invention

This invention relates to a porous membrane which consists essentially of a thermoplastic resin and has three-dimensional network structure including communicating micro-pores with a high porosity, and which is excellent in water entry pressure, air permeability and oil permeability and has good mechanical strengths and dimensional stability. It also relates a process for preparing such a thermoplastic resin porous membrane.

2. Description of the Prior Art

Recently, the technique concerning synthetic resin porous articles has made striking progress, and application ranges of porous articles having communicating pores as elements of various filters have especially be expanded. Among these porous articles, porous membranes including a water-repellent thermoplastic resin as a substrate have excellent functions suitable for microfilters for separating gases and separating oils and water from each other and for waterproof air-permeable membranes.

As the water-repellent porous articles, there have been known those prepared according to a sintering method, a nonwoven fabric method (a synthetic pulp method), a drawing method, a phase separation method and an extraction method.

According to the sintering method, a thermoplastic resin powder is partially melted at an appropriate temperature under an appropriate pressure to form a porous article. The porous article prepared according to this method has coarse pores, and the pore diameter is ordinarily scores of microns or larger. Accordingly, this porous article is not suitable for its separation of water from oil or other substances.

According to the nonwoven fabric method, it is ordinarily very difficult to obtain a porous article having micro-pores uniform in the pore diameter, and the porosity cannot be enhanced to the desired extent. Therefore, a porous article suitable for a microfilter cannot be obtained.

As the drawing method, Japanese Patent Publication No. 40,119/71 discloses a method comprising drawing a thermoplastic resin sheet of a molten state, annealing the resulting film and drawing the annealed film to form a porous membrane. The obtained product does not possess a three-dimensional network structure but a plane structure, and the porosity can be up to about 60% at most if it is required to form uniform and fine pores. Furthermore, since the drawing operation is conducted only in one direction, the anisotropy is conspicuous in the physical properties of the obtained porous article, and the strength factor F (described hereinafter) in the lateral direction is smaller than 1. The worst defect of the drawing method is that since the plastic material is highly drawn, the dimensional stability is poor and the use of the porous article at high temperatures is limited.

As the phase separation method, Japanese Laid-open Patent Application No. 22,398/80 discloses a method in which a thermoplastic resin is mixed with a high-boiling-point solvent inactive to said resin at a high temperature capable of providing a homogeneous phase to form a solution, the resulting solution is extruded through a slit and the extrudate is cooled to cause phase separation of the high-boiling-point solvent from the resin whereby a porous article is obtained. The porous article prepared according to the phase separation method comes to have a network structure in which cells having a relatively large size are communicated through fine pores. When the porosity is increased to a high level, the obtained porous article fails to have a strength sufficient to resist actual applications.

According to the extraction method, a thermoplastic resin is mixed with fine particles that can be extracted by an acid, an alkali or a solvent, optionally together with a liquid compound such as an oil or plasticizer, the mixture is molten, plasticized and extruded to form a film, and then, the fine particles and liquid compound are removed from the film by extraction using an appropriate solvent to form a porous membrane. In this method, in view of the moldability, it is not permissible to reduce the quantity of the polymer below a certain limit and at the extraction step, a considerable quality of shrinkage inevitable occurs. Accordingly, it is very difficult to obtain a porous membrane having a high porosity exceeding 80%. The porous membrane prepared according to this extraction method has a network structure, but the strength factor F (described hereinafter) is smaller than 1.

As another known drawing method, Japanese Patent Publication No. 18,991/76 discloses a method in which a pasty extrudate of polytetrafluoroethylene is monoaxially or biaxially drawn and the drawn extrudate is sintered at a temperature of higher than the melting point the polymer to obtain a porous article. According to this method, a fine-pore membrane having a network structure and a high porosity can be obtained, and the strength factor F (described hereinafter) of the porous article in the drawing direction is larger than 1 but the modulus factor F' (described hereinafter) is as small as 0.1 or less. Furthermore, the porous article prepared according to this method is characterized in that the creep under tensile and compressional stresses are very high, and it cannot practically be used without being supported by an other supporting member. The reason is that the porous membrane prepared according to this method has a structure formed of "nodes and fibrils". More specifically, the fibril is a fine fiber formed of very highly oriented PTFE (polytetrafluoroethylene) exhibiting a high tenacity, and the node is formed of a sintered body of unoriented PTFE particles. In this structure, the cohesive force among the particles is very low. Therefore, even when a very small stress is applied, slips are caused among the particles of the nodes. Such slip is a kind of plastic deformation, and even after the stress is removed, the original condition is not restored at all. This means that if the porous article is used under certain stress conditions, the creep is readily advanced and that even if the stress is removed, residual deformation is very large. Moreover, the resin that can be employed in this method is limited to a polytetrafluoroethylene resin.

As will be apparent from the foregoing description, a micro-pore membrane of a high porosity which is water-repellent and has a strength sufficient to resist actual applications cannot be provided according to the conventional teachniques of preparing porous membranes.

SUMMARY OF THE INVENTION

It is therefore a primary object of the present invention to provide a thermoplastic resin porous membrane having a three-dimensional network structure including communicating micro-pores with a high porosity, which membrane is soft and excellent in water entry pressure, air permeability and oil permeability and possesses good mechanical strengths and dimensional stability.

Other objects and advantages of the present invention will be apparent from the following description.

In one fundamental aspect of the present invention, there is provided a thermoplastic resin porous membrane which is formed of a thermoplastic resin having a critical surface tension of not higher than 35 dyn/cm and having a three-dimensional network structure wherein, communicating pores having a porosity of at least 60% and an average pore diameter of 0.1 to 2.0 microns are formed. The strength factor F of the membrane, defined by the following formula (1):

$$F = A/[B(1-\alpha)] \qquad (1)$$

wherein A stands for the tensile strength at break of the porous membrane, B stands for the tensile strength at break of a non-porous film formed of the same resin and $\alpha$ stands for the porosity fraction of the porous membrane, which is at least 1 as measured in any direction, and the thickness of the porous membrane is in the range of from 5 to 500 microns. The porous membrane preferably exhibits a modulus factor F', defined by the following formula (2), of at least 0.2 as measured in any direction:

$$F' = C/[D(1-\alpha)] \qquad (2)$$

wherein C stands for the tensile stress of the porous membrane at 5% deformation, D stands for the tensile stress of a non-porous film formed of the same resin at 5% deformation, and $\alpha$ stands for the porosity fraction of the porous membrane. Furthermore, the porous membrane possesses good creep characteristics, namely, the quantity of deformation caused when the membrane is subjected to a tensile strength corresponding to 5% of the tensile strength at break of the porous membrane at 20° C. for 100 hours is preferably not more than 15%, and the quantity of residual deformation after removal of said tensile stress is preferably not larger than 5%.

In another fundamental aspect of the present invention, there is provided a process for preparing the above-mentioned thermoplastic resin porous membrane, wherein a porous membrane formed of a thermoplastic resin having a critical surface tension of not higher than 35 dyn/cm and having a three-dimensional network structure including communicating pores having an average pore diameter of 0.05 to 1 micron with a porosity of 30 to 70%, is subjected to a space drawing operation in at least one direction at a temperature between the temperature of 50° C. lower than the melting or softening point of said thermoplastic resin and the temperature of 5° C. lower than the melting or softening point of said thermoplastic resin, and then, if desired, the drawn porous membrane is further subjected to a space heat treatment at a temperature of between 50° C. lower than the melting or softening point of said thermoplastic resin and 5° C. lower than the melting or softening point of said thermoplastic resin.

DESCRIPTION OF THE PREFERRED EMBODIMENTS

Figure 1:
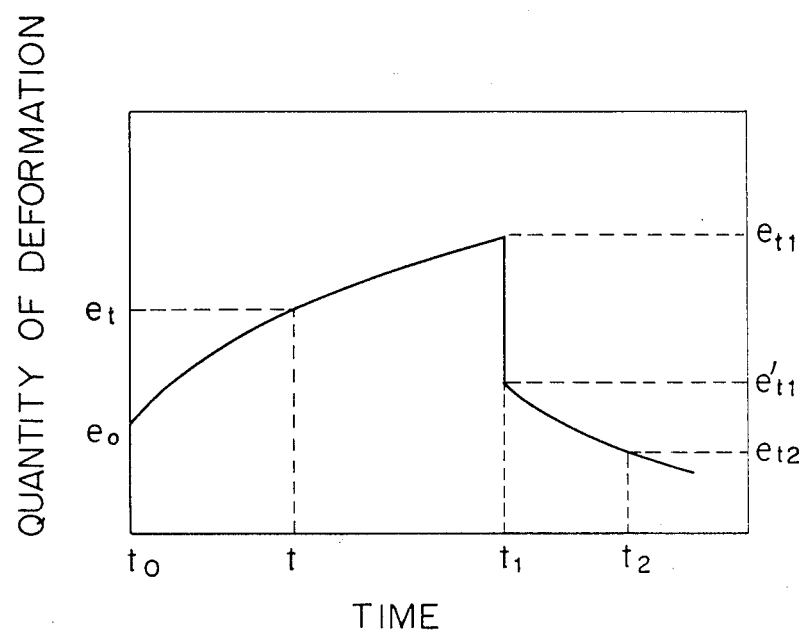
FIG. 1 is a graph of quantity of deformation versus time, illustrating the occurrance of creep and recovery of creep.

The porous membrane of the present invention is essentially formed of a thermoplastic resin having a critical surface tension of not higher than 35 dyn/cm. By the term "critical surface tension" used in the instant specification and appended claims is meant the surface tension on the solid surface at a contact angle $\theta$ of 0°. Contact angles of the solid surface with various liquids differing in the surface tension are determined and the surface tension at a contact angle $\theta$ of 0° is calculated by extrapolation. This surface tension is defined as the critical surface tension $\gamma C$. This critical surface tension $\gamma C$ indicates that the solid surface is not wetted with a liquid having a surface tension exceeding the critical surface tension $\gamma C$. Accordingly, the fact that the critical surface tension $\gamma C$ is not higher than 35 dyn/cm means that the solid surface is wetted with many liquid organic compounds but it is not wetted with water or aqueous solutions. In the present invention, by using a thermoplastic resin satisfying this requirement, it becomes possible to provide a porous membrane suitable as an oil filter or as a filter separating water from a gas or oil.

As a thermoplastic resin having a critical surface tension $\gamma C$ of not higher than 35 dyn/cm, there can be mentioned, for example, fluorine plastics, polyethylene, polypropylene, polystyrene, poly(methylpentene-1), poly(methyl methacrylate), poly(dimethylsiloxane) and mixtures thereof. From the viewpoints of the moldability, chemical resistance and mechanical strength, fluorine plastics, polyethylene and polypropylene are preferable.

The permissible lower limit of the critical surface tension $\gamma C$ is not particularly limited and may ordinarily be lowered to approximately 16 dyn/cm. A preferable critical surface tension $\gamma C$ is in the range of from 20 to 33 dyn/cm.

In membranes used for separation, not only the material per se but also the pore structure, pore diameter and porosity are ordinarily of great significance. The pore structure and pore diameter have a great influence on the separation efficiency, and the porosity has great influences on the permeation quantity.

Porous structures of porous membranes are roughly divided into two types, that is, the through-pore structure in which pores extend through the membrane substantially linearly from the front surface to the back surface and the three-dimensional network structure including communicating pores. The porous membrane of the present invention belongs to the latter type. The network structure including communicating pores is characterized in that the porosity can be increased to a very high level, the pass length is more prolonged as compared with the pass length in the through-pore type membrane having the same thickness and the actual pore diameter is much smaller than the diameter of pores exposed to the surface.

The average pore diameter of the porous membrane of the present invention should be 0.1 to 2.0 microns, preferably 0.1 to 1.5 microns. According to the customary classification system, a porous membrane having such average pore diameter is included in the category of a microfilter. The reason why the average pore diameter is limited within this range is that it is intended to provide a porous membrane capable of separating various kinds of dust and bacteria, separating blood cell components from blood and separating solid particles of carbon and the like from certain emulsions and oils.

In the present invention, it is preferred that the water entry pressure resistance of the porous membrane be in the range of from 500 to 20,000 mmH$_2$O, especially from 1,000 to 20,000 mmH$_2$O. The water entry pressure resistance referred to herein means the pressure under which permeation of water begins to occur, which is defined according to the method of Japanese Industrial standard L-1079. A relation represented by the following formula is ordinarily established when a liquid permeates through pores:

$$P \cdot r = -2\sigma \cos \theta$$

wherein r stands for the pore radius, P stands for the pressure at which the liquid begins to permeate, $\theta$ stands for the contact angle between the liquid and the membrane, and $\sigma$ stands for the surface tension of the liquid. P in the above formula is the water entry pressure when the liquid is water, and the water entry pressure is determined according to the surface tension of the material of the membrane and the pore radius (the maximum pore size in this case). In case of the porous membrane of the present invention, for example, a porous membrane formed of polypropylene having a critical surface tension of 29 dyn/cm, the water entry pressure is 1,500 mmH$_2$O when the average pore diameter is 1 micron (the maximum pore diameter is 2 microns), the water entry pressure is 3,000 mmH$_2$O when the average pore diameter is 0.35 micron (the maximum pore diameter is 0.9 micron), and the water entry pressure is 10,000 mmH$_2$O when the average pore diameter is 0.1 micron (the maximum pore diameter is 0.25 micron). It is seen that in each case, the porous membrane has an excellent waterproof quality.

The porosity of the porous membrane should be at least 60% so that the permeation quantity is increased to the desired extent. The porosity may be up to approximately 98% and preferably in the range of from 80 to 98%. The porosity is limited within this range so as to increase the permeation quantity. Ordinarily, the permeation quantity is proportional to the porosity and pore area of the membrane, and it is desirably for a separation membrane to have a higher porosity and a larger pore area. In case of a separation membrane having a small porosity, in order to increase the permeation quantity, it is conventional to reduce the thickness of the membrane, increase the membrane area or increase the difference in the pressure on one side of the membrane and on the other side thereof. However, reduction of the thickness or increase of the pressure difference is not preferred, because this tends to result in breakage or deformation of the membrane. Moreover, if the pressure difference is increased, the separation efficiency is reduced upon separation of water from oils or separation of emulsions as pointed out hereinbefore. Moreover, increase of the membrane area and elevation of the pressure result in economical disadvantages because the running cost for the separation is increased. When the porous membrane is used as a material to be impregnated with a liquid, a higher porosity is preferred. For example, when the porous membrane is used in the state impregnated with an electrolyte as in case of a separator of an alkaline battery, the higher the porosity, the lower the electric resistance. Furthermore, when the porous membrane of the present invention which has a high porosity is used as an insulating oil-impregnated material of a condenser or electrolyte-impregnated material or the like, the quantity of the insulating oil or electrolyte contained per unit thickness can be increased and the size can be diminished in the formed condenser or the like.

The porous membrane of the present invention should possess a strength factor F of at least 1 as measured in any direction. If this requirement is satisfied, a practically satisfactory mechanical strength is obtained. Ordinarily, in porous membranes, the strength is in inverse proportion to the porosity, and when the porosity is higher than approximately 80%, the strength is very low. However, according to the present invention, even if the porosity is high, the porous membrane has a strength comparable to that of a non-porous film made of the same resin.

From the practical viewpoint, the elasticity and creep characteristics of the porous membrane are also important. The modulus of elasticity is used as a criterion indicating the quantity of deformation in the load-applying direction which is caused when a small quantity of load is applied. Among the stress $\sigma$, deformation quantity e and modulus of elasticity E, the following relation is established:

$$\sigma = e \cdot E$$

When the modulus of elasticity of a porous membrane is compared with that of a non-porous film of the same resin, it is seen that the modulus of elasticity of the porous membrane is much lower than the value calculated from the porosity thereof. The reason is that initial deformation occurs in the weakest portion of the membrane. In case of a porous membrane having a three-dimensional network structure, it is considered that the modulus of elasticity is remarkably influenced by the non-uniformity of the network structure and the pore diameter distribution range. A porous membrane having a modulus factor F' of at least 0.2, as in the case of the porous membrane of the present invention, is not found in conventional porous members having a porosity higher than 80%. Only from this viewpoint, it will readily be understood that the porous membrane of the present invention is unique and excellent.

When deformation of a separation membrane is considered from the practical view point, it is seen that deformation occurring under application of a tensile load causes expansion of the pore size, resulting in reduction of the separation efficiency, and deformation occurring under application of a compressive load causes reduction of the pore diameter and reduction of the porosity, with the result that the permeation capability is lowered.

The creep characteristic as well as the modulus of elasticity has a significant influence on the deformation of the membrane. FIG. 1 is a view diagrammatically illustrating the mechanism of occurrence of creep and recovery of creep. In FIG. 1, $e_0$ stands for the quantity of deformation at the moment a load is applied, which is a value determined depending upon the modulus of elasticity of the material, and $e_t$ stands for the quantity of deformation after passage of the time t and $(e_t - e_0)$ is called the quantity of creep deformation after passage of the time t, which is a value determined depending upon the viscoelasticity of the material resin and the network structure in the porous membrane. If the load is removed after passage of the time $t_1$, the quantity of deformation is instantaneously changed from $e_{t1}$ to $e'_{t1}$, and the difference $(e_{t1} - e'_{t1})$ is called the quantity of instantaneous creep recovery and $e'_{t1}$ is called the quantity of residual deformation. Furthermore, the difference $(e'_{t1} - e_{t2})$ is called the quantity of delayed recovery. Even if the time passes from a certain point, the quantity of deformation is not reduced but is kept constant at a level of e. This is called the quantity of permanent residual deformation (not shown in FIG. 1). The above-mentioned creep phenomenon proceeds according to the same mechanism whether a tensile stress or a compressive stress is applied. In the case of industrial filters, compressive stresses are often applied, and while the operation is conducted for a long time under the application of pressure, clogging is caused in the filter because of the creep phenomenon, resulting in reduction of the permeation capability. This is ordinarily called "compaction". In the case of a membrane having a high creep recovery ratio, the capability is considerably restored if the operation is stopped for a while after the operation has been continued for a certain time. Accordingly, such membrane having a high creep recovery ratio is preferably used as an industrial filter.

In the thermoplastic resin porous membrane of the present invention, the quantity of deformation caused when the membrane is subjected to a tensile stress corresponding to 5% of the tensile strength at break of the porous membrane at 20° C. for 100 hours is preferably not more than 15%, and the quantity of residual deformation after removal of said tensile stress is preferably not larger than 5%. The quantity of deformation can be reduced to a value as measured at the moment a load is applied, i.e., the value $e_0$ shown in FIG. 1. The quantity of residual deformation can be reduced to approximately 1%.

Furthermore, the modulus of elasticity and creep characteristic have a great influence on the adaptability of the porous membrane to the assembling operation of combining the porous membrane with other various products, for example, the operation of laminating the porous membrane on other film or fibrous product or the operation of covering other material with the porous membrane. For the assembling operation of a membrane which is readily deformed and in which creep readily occurs, an expensive tension adjusting mechanism is ordinarily necessary. In the case of the porous membrane of the present invention, such an expensive mechanism need not be used at all.

It is indispensable that the porous membrane of the present invention should have a three-dimensional network structure wherein communicating pores having the above-mentioned average pore diameter with the above-mentioned porosity are formed. A porous membrane having pores having a pore diameter of not more than 2 microns and having a porosity of at least 60% and a large open pore area cannot posses a structure other than the three-dimensional network structure.

The thickness of the porous membrane of the present invention should be in the range of from 5 to 500 microns. This limitation is set because the porous membrane is required to be thick enough to show no substantial contraction after treatment with an aqueous solution of a surface active agent or the like or after drying treatment and also is required to have an appropriate permeation quantity.

In the present invention, furthermore, it is preferred that the air permeability of the porous membrane be in the range of from 5 to 500 sec/cc.100$\mu$ and the areal shrinkage at a temperature of 50° C. lower than the melting or softening point of the thermoplastic resin constituting the porous membrane be not more than 5%. The areal shrinkage at that temperature can be reduced to approximately 0.5%.

The porous membrane of the present invention having the above-mentioned structural characteristics is advantageously used in various fields. For example, the porous membrane of the present invention is especially suitably used as a microfilter for catching fine particles, a water-separating microfilter, a plasma-separating membrane and a separator of an alkaline battery.

The plasma-separating membrane is a membrane for separating solid components from a shapeless component in blood. Red blood cells, leukocytes and platelets are mentioned as the solid components, and the shapeless component is plasma which comprises water, soluble proteins, saccharides, lipids, hormones, enzymes and electrolytes. The plasma-separating membrane is used for the collection of plasma by separating plasma for clinical treatment and formation of a plasma preparation from normal blood (the solid components are returned into the body of the blood donor) and for the remedy of a disease by removing harmful components from blood of a patient. In each case, the separation is carried out by centrifugal separation according to conventional techniques.

The plasma-separating membrane should possess a good adaptability to the living body, a high separation capability suitable for the intended object and a high water permeability. If the porous membrane of the present invention is subjected to a treatment which makes it hydrophilic, a membrane especially suitable for the collection of plasma can be obtained.

An alkaline battery separator is interposed between two electrodes of the alkaline battery to prevent formation of a short circuit between the two electrodes and also to prevent migration of active substances between the electrodes. The properties required for the battery separator are a low electric resistance, a high corrosion resistance against the electrolyte and a good electrolyte-retaining property. A porous membrane having a high porosity and a small pore diameter is suitable as the battery separator. Since the porous membrane of the present invention is water-repellent, it cannot directly be used as a battery separator. However, if the porous membrane of the present invention is subjected to a treatment which makes it hydrophilic (for example, treatment with a surface active agent), the porous membrane can be used as a battery separator. This battery separator is characterized by such a low electric resistance which is not attained in conventional separators, and since the thickness can be reduced, it is possible to decrease the dimensions of the battery.

The above-mentioned porous membrane of the present invention can be produced according to the following process. This porous membrane cannot be prepared according to any of conventional processes. According to the process of the present invention, a porous membrane having a three-dimensional network structure is drawn in at least one direction, preferably in at least two directions, under specific conditions, whereby the porosity is increased and the strength is simultaneously enhanced.

In the process of the present invention, a porous membrane formed of a thermoplastic resin having a critical surface tension of not higher than 35 dyn/cm, preferably not higher than 33 dyn/cm, and having a three-dimensional network structure wherein communicating pores having an average pore diameter of 0.05 to 1 micron with a porosity of 30 to 70% is used as the starting material. The process for preparing this starting porous membrane is not particularly critical provided that the starting porous membrane satisfies the above requirement. Such preparation process is illustrated in Examples given hereinafter.

If the porosity is lower than 30%, it is difficult to obtain a porosity of at least 60% by drawing, and, in contrast, if the porosity exceeds 70%, it is difficult to perform the drawing operation stably. For these reasons, the porosity is limited to the range of from 30 to 70% in the starting porous membrane.

At the drawing step, the pore diameter is increased as well as the porosity. Accordingly, the average pore diameter of the starting porous membrane is limited to the range of from 0.05 to 1 micron so that the average pore diameter of the product membrane is in the range of from 0.1 to 2 microns.

The reason why the three-dimensional network structure of the starting porous membrane is essential is that if a membrane having through-pores extending substantially linearly from one predominant surface to the other predominant surface is drawn, a final product having the desired three-dimensional network structure cannot be obtained and that it is very difficult to perform the drawing operation stably.

Drawing of the above-mentioned starting porous membrane should be accomplished by space drawing, because a high porosity-increasing effect can be attained by the space drawing operation. The space drawing operation referred to herein means a non-contact type drawing operation, and for example, there can be mentioned a bubble drawing method, a tenter drawing method and a certain roll drawing method. However, the bubble drawing is not preferred for drawing of porous membranes.

When the above-mentioned starting porous membrane is drawn according to a contact type drawing method such as a hot plate drawing method, the thickness reduction ratio is substantially equal to the reciprocal number of the areal expansion ratio, while the porosity is not substantially increased. In contrast, when the starting porous membrane is drawn according to the non-contact tenter drawing method, i.e., one of the space drawing methods, the thickness reduction ratio is about ½ of the reciprocal number of the areal expansion ratio and the porosity is increased. This is quite surprising. In case of the contact drawing method, it is believed that a considerable compressive force acts in the direction vertical to the membrane surface in addition to the drawing force acting in the drawing direction, and the pore structure is destroyed as in the case where the thickness is reduced when an ordinarly non-porous film is drawn. In contrast, in case of the non-contact space drawing method, it is believed that the drawing force in the plane direction is appropriately dispersed in the direction of the thickness (which is presumably due to the specific network structure of the polymer), with the result that the thickness reduction ratio becomes small as compared with the areal expansion ratio. For the reasons set forth above, the space drawing method is suitably adopted when it is intended to increase the porosity. In the case where the drawing operation is carried out in at least two sequential stages in at least two directions, if the last drawing operation is conducted according to the space drawing method, the intended object of increasing the porosity can be attained even when the preceding drawing operation is conducted according to the contact drawing method. Therefore, this embodiment can be employed in the process of the present invention.

Another important condition for the drawing operation is the temperature condition. More specifically, it is indispensible that the porous membrane should be drawn at a temperature of 5° to 50° C. lower, preferably 8° to 30° C. lower, than the melting or softening point of the thermoplastic resin constituting the porous membrane. If the drawing operation is carried out at a temperature higher than the melting point or softening point of the thermoplastic resin or at a temperature of up to 5° C. lower than the melting point or softening point of the thermoplastic resin, the thermoplastic resin is molten or the porous structure is destroyed even if the resin is not molten. When the drawing operation is carried out at a temperature of at least 50° C. lower than the melting point or softening point of the thermoplastic resin, crystallization by drawing is not sufficiently advanced and one of the intended objects of the present invention, that is, increase of the mechanical strengths, cannot be attained. More specifically, the strength factor F of at least 1 or the modulus factor F' of at least 0.2 cannot be attained, and the creep characteristics and dimension stability are drastically degraded in the resulting porous membrane. Furthermore, if the drawing operation is carried out at such a low temperature, the drawing stress is high and the membrane is readily broken during the drawing operation, or the drawing becomes uneven, even if breakage is not caused.

In most of the porous membrane haivng an ordinary network structure, the strength factor F is in the range of from 0.2 to 0.7, and none of them have a strength factor F of at least 1. In a porous membrane prepared by the so-called two-stage drawing method in which melt drawing is first carried out and cold drawing is then carried out, the strength factor F is at least 1 in the direction of drawing, but the strength factor F in the direction at right angles to the direction of drawing is about 0.5. Furthermore, in a porous membrane formed by drawing a pasty extrudate of PTFE and then sintering the extrudate, the strength factor F is higher than 1, but because the structure is uneven, the modulus factor F' is lower than 0.1 and the creep characteristics are inferior. In contrast, in the porous membrane prepared according to the process of the present invention, the strength factor F is at least 1 as measured in any direction and the modulus factor F' is at least 0.2 as measured in any direction, and, it has been confirmed that if the drawing temperature and drawing ratio are appropriately chosen, it can be easily accomplished to obtain a porous membrane in which the strength factor is equal to 8 and the modulus factor F' is equal to 1. To our great surprise, it has been found that strength factor F and the modulus factor F' can be increased to approximately 15 and approximately 2.0, respectively.

As will be apparent from the foregoing description, if the above-mentioned starting porous membrane is drawn under specific conditions, the porosity can be increased and simultaneously, the mechanical strength can be increased. However, a defect is brought about by drawing. More specifically, as is well-known, the dimensional stability is degraded, and the problem of thermal shrinkage at a high temperature is especially serious. Moreover, a high-porosity drawn porous membrane has such a peculiar property that when the membrane is dipped in an aqueous solution of a surface active agent and is then dried, a considerable quantity of contraction is observed. Such contraction or shrinkage results not only in a change of dimensions but also in a reduction of the porosity and pore size. Accordingly, this problem is very serious.

As means for reducing the degree of the above-mentioned thermal shrinkage and contraction by the wetting treatment with a surface active agent, a method in which the heat treatment is carried out after drawing is very effective even for porous membranes, and this method can be adopted if necessary in the process of the present invention. Also in the heat treatment of the drawn porous membrane, the space treatment, that is, the non-contact type treatment, is indispensable as in the drawing treatment. Furthermore, as in case of the drawing treatment, the temperature for the heat treatment should be 5° to 50° C. lower than the melting or softening point of the thermoplastic resin. It is ordinarily preferred that the heat treatment be carried out at a temperature higher than the drawing temperature.

The effects of the present invention will now be described in detail with reference to the following Examples that by no means limit the scope of the present invention.

Incidentally, the properties described in the text of the specification and Examples were determined according to the following measurement methods.

Porosity (%)

The porosity is calculated according to the following formula:

$$\text{Porosity} = \frac{\text{(pore volume)}}{\text{(volume of porous membrane)}} \times 100$$

The ratio of pore volume to volume of porous membrane is herein referred to as "porosity fraction".

Pore Volume (cc)

The pore volume is measured by a mercury porosimeter.

Average Pore Diameter (micron)

The pore diameter at the point of the pore volume corresponding to $\frac{1}{2}$ of the total pore volume in the pore size-pore volume integration curve determined by using a mercury porosimeter is designated as the average pore diameter.

Water Entry Pressure (mmH$_2$O)

The water entry pressure is measured according to the method A of Japanese Industrial Standard (JIS)L-1097.

Air Permeability (sec/100 cc.sheet or sec/100 cc.100 microns)

The air permeability is measured according to the method A of ASTM D-762.

Tensile Strength at Break (Kg/cm$^2$)

The tensile strength at break is measured according to the method of ASTM D-882 by using an Instron type tensile tester at a straining rate of 50%/min.

Electric Resistance ($\Omega$-dm$^2$/sheet of $\Omega$-dm$^2$/100 microns)

The electric resistance is measured according to the method of JIS C-2313 by using an electrode plate formed of pure nickel and an aqueous solution of KOH having a specific gravity of 1.30 as an electrolyte.

EXAMPLE 1

In a Henschel mixer, 100 parts by weight of finely divided silica [marketed under the tradename of "Nipsil VN 3LP" and having a specific surface area of 280 m$^2$/g and an average particle size of 16 nm (nanometer)] was sufficiently mixed with 242 parts by weight of dibutyl phthalate (DBP), and 148 parts by weight of a powered polypropylene resin (marketed under the tradename of "Sumitomo Noblene D501", MFI=0.5) were added to the mixture. The resulting mixture was blended again to form a homogeneous composition. The composition was extruded in the form of a film at a temperature of 190° C. by a film-forming apparatus comprising a 30-mm biaxial extruder provided with a T-die having a width of 400 mm. The operation of dipping the formed film in 1,1,1-trichloroethane (marketed under the trade name of "Chlorothene VG") for 5 minutes was repeated three times to remove DBP by extraction. Then, the film was dried and dipped in a 40% aqueous solution of sodium hydroxide maintained at 70° C. for 5 minutes to dissolve out the finely divided silica, and the film was then washed with water and dried.

The obtained membrane was 0.14 mm in thickness and had a smooth surface, and the amounts of the residual silica and DBP were smaller than 0.1% and the membrane was composed substantially of polypropylene and had a critical surface tension of 29 dyn/cm. When the membrane was observed by an electron microscope, it was found that the membrane had a three-dimensional network structure.

Then, the porous membrane was drawn in the longitudinal direction by a roll-type drawing machine maintained at 130° C. and then drawn in the transverse direction in an atmosphere maintained at 150° C. by a tenter type drawing machine. The drawing ratios adopted are shown in Table 1, below. Then, the drawn porous membrane was subjected to a space heat treatment in an atmosphere maintained at 155° C. at a relaxation ratio of 5% only in the transverse direction. Each of the porous membranes obtained under the drawing conditions shown in Table 1, below, was a porous membrane having a smooth surface. The physical properties of the obtained membranes are shown in Table 1, below.

TABLE 1

| Item | Run 1 | Run 2 | Run 3 | Run 4 | Run 5 |
|---|---|---|---|---|---|
| Drawing ratio in longitudinal direction (times) | — | 2 | 3 | 3.5 | 4 |
| Drawing ratio in transverse direction (times) | — | 2 | 3 | 3.5 | 4 |
| Thickness (microns) | 140 | 51 | 27 | 20 | 16 |
| Porosity (%) | 53 | 80 | 86 | 91 | 95 |
| Average pore diameter (microns) | 0.20 | 0.24 | 0.38 | 0.45 | 0.53 |
| Maximum pore diameter (microns) | 0.40 | 0.78 | 0.96 | 1.03 | 1.15 |
| Air permeability (sec/100 cc-sheet) | 133 | 13 | 8 | 6 | 5 |

TABLE 1-continued

| Item | Run 1 | Run 2 | Run 3 | Run 4 | Run 5 |
|---|---|---|---|---|---|
| Hydraulic pressure resistance (mmH$_2$O) | 6430 | 3300 | 2680 | 2490 | 2240 |
| Tensile strength at break Kg/cm$^2$ | | | | | |
| MD | 85 | 95 | 126 | 131 | 135 |
| TD | 70 | 86 | 122 | 133 | 139 |
| Tensile elongation at break (%) | | | | | |
| MD | 170 | 52 | 27 | 29 | 21 |
| TD | 172 | 48 | 21 | 29 | 18 |
| Tensile modulus of elasticity Kg/cm$^2$ | | | | | |
| MD | 1300 | 510 | 490 | 560 | 1300 |
| TD | 1400 | 550 | 690 | 630 | 1200 |
| Strength factor F | | | | | |
| MD | 0.56 | 1.5 | 2.8 | 4.5 | 8.4 |
| TD | 0.46 | 1.3 | 2.7 | 4.6 | 8.7 |
| Modulus factor F' | | | | | |
| MD | 0.40 | 0.37 | 0.51 | 0.92 | 3.8 |
| TD | 0.44 | 0.40 | 0.72 | 1.1 | 3.5 |
| Creep deformation quantity* (%) | 1.4 | 2.7 | 2.6 | 3.3 | 1.6 |
| Residual deformation quantity** (%) | 0.7 | 0.9 | 0.8 | 0.9 | 0.4 |
| Thermal shrinkage ratio*** (%) | 0.1 | 0.9 | 2.5 | 4.0 | 4.5 |

Note
*quantity of deformation after 100 hours' standing under tensile stress corresponding to 5% of the tensile strength at break
**quantity of residual deformation after removal of load under the above conditions
***ratio of shrinkage after standing in oven at 113° C. for 30 minutes

EXAMPLE 2

The undrawn porous membrane used in Example 1 was drawn in both the longitudinal and transverse directions at a drawing ratio of 3 at the drawing temperature shown in Table 2 below. When the drawing operation was carried out at room temperature (18° C.), the membrane was broken and no drawn porous membrane was obtained. When the drawing operation was carried out at 60° C., the thickness was uneven and the obtained membrane could not be used as a test sample. When the drawing operation was carried out at 165° C., the membrane was molten. The physical properties of the obtained membranes are shown in Table 2, below.

TABLE 2

| Item | Run 6 | Run 7 | Run 8 | Run 9 | Run 10 |
|---|---|---|---|---|---|
| Temperature for drawing in longitudinal direction (°C.) | 80 | 110 | 130 | 130 | 130 |
| Temperature for drawing in transverse direction (°C.) | 90 | 120 | 145 | 155 | 160 |
| Thickness (microns) | 90 | 70 | 35 | 17 | 10 |
| Porosity (%) | 98 | 97 | 96 | 78 | 68 |
| Average pore diameter (microns) | 0.45 | 0.42 | 0.38 | 0.35 | 0.30 |
| Air permeability (sec/100 cc.sheet) | 10 | 9 | 7 | 15 | 20 |
| Tensile strength at break (Kg/cm$^2$) (MD) | 5 | 54 | 95 | 323 | 445 |
| Tensile elongation at break (%) (MD) | 8 | 14 | 25 | 31 | 40 |
| Tensile modulus of elasticity (Kg/cm$^2$) (MD) | 60 | 270 | 430 | 2200 | 4500 |
| Strength factor F (MD) | 0.78 | 5.6 | 7.4 | 4.6 | 4.3 |
| Modulus factor F' (MD) | 0.4 | 1.3 | 1.6 | 1.5 | 2.0 |

EXAMPLE 3

In a Henschel mixer, 100 parts by weight of finely divided silica (marketed under the trade name of "Nipsil VN 3LP" and having a specific surface area of 280 m$^2$/g and an average particle size of 16 nm) was sufficiently mixed with 228 parts by weight of dioctyl terephthalate (DOP), and then, 97 parts by weight of a powdered high density polyethylene resin (supplied under the trade name of "Suntec B180P" and having a weight average molecular weight of 250,000) was added. Then, the mixture was blended again to form a homogeneous composition. The composition was extruded in the form of a film by a film-forming apparatus comprising a 30-mm biaxial extruder provided with a T-die having a width of 400 mm. The formed membrane was dipped in 1,1,1-trichloroethane (supplied under the trade name of "Chlorothene VG") for 5 minutes to extract DOP, and the membrane was dried and dipped in a 40% aqueous solution of sodium hydroxide maintained at 70° C. for 5 minutes to extract the finely divided silica. Then, the membrane was washed with water and dried.

The obtained membrane was 0.2 mm in thickness and had a smooth surface, and the amounts of the residual silica and DOP were smaller than 0.1% and the membrane was composed substantially of polyethylene and had a critical surface tension of 31 dyn/cm. By the measurement by a mercury porosimeter, it was found that the average pore diameter was 0.15 micron and the porosity was 65%. Through electron microscope observation, it was confirmed that the membrane had a network pore structure. The strength factor F was 0.6 as measured in any direction.

The porous membrane was drawn at 110° C. in both the longitudinal and transverse directions at a drawing ratio of 3 by using a tenter type biaxial drawing machine, and was then subjected to a space heat treatment at the same temperature at a relaxation ratio of 10%.

The substantial areal expansion ratio in the obtained membrane was 7.3, and the obtained membrane was a porous membrane having a thickness of 60 microns and including pores having an average pore diameter of 0.35 micron with a porosity of 88%. The water entry pressure was 4,000 mmH$_2$O, the air permeability was 70 sec/100 cc.100 microns, and the tensile strength at break was 320 kg/cm$^2$ in each of the longitudinal and transverse directions. The strength factor F was 6. When the porous membrane was placed in a hot air oven maintained at 80° C. for 30 minutes, the areal shrinkage was 2.5%, and when the membrane was dipped in an aqueous solution of a surface active agent maintained at 50° C. for 30 minutes and was then washed with water and dried, no contraction was observed.

EXAMPLE 4

In the same manner as described in Example 1, an undrawn porous membrane having a thickness of 0.15 micron was prepared from a composition comprising 100 parts by weight of finely divided silica (marketed under trade name of "Aerosil #200" and having an average particle size of 12 nm and a specific surface area of 200 m$^2$/g), 220 parts by weight of dioctyl phthalate and 265 parts by weight of an ethylene/tetrafluoroethylene copolymer (marketed under trade name of "Tefzel 200"). The porous membrane was characterized by an average diameter of 0.1 micron and a porosity of 63% and it had a three-dimensional network structure. The critical surface tension of the polymer of the porous membrane was 27 dyn/cm and the strength factor F was 0.45. The porous membrane was subjected to the space drawing treatment in both the longitudinal and lateral directions at a draw ratio of 2.5 at a temperature of 250° C. by a tenter type biaxial drawing machine and was then subjected to the space heat treatment under tension at 250° C.

The obtained porous membrane had a thickness of 75 microns and was characterized by an average pore diameter of 0.55 micron, a porosity of 85%, a water entry pressure of 8,000 mmH$_2$O and an air permeability to 60 sec/100 cc 100 microns. The strength factor F was 1.8 as measured in any direction.

EXAMPLE 5

A porous membrane was prepared from a composition comprising 100 parts by weight of finely divided silica (Aerosil #200), 202 parts by weight of dioctyl phthalate and 155 parts by weight of a powdered polyvinylidene fluoride resin (marketed under the trade name of "KF #100") in the same manner as described in Example 1. The resulting porous membrane had a thickness of 0.2 mm and a three-dimensional network structure and was characterized by an average pore diameter of 0.3 micron and a porosity of 63%. The critical surface tension of the polymer of the porous membrane was 26 dyn/cm. The tensile strength at break of the membrane was 92 Kg/cm$^2$ and the strength factor F was 0.50.

The porous membrane was drawn in both the longitudinal and transverse directions at a drawing ratio of 3 at 150° C. by using the same drawing machine as used in Example 1, and the drawn membrane was subjected to the space heat treatment under tension at 155° C.

The obtained porous membrane had a thickness of 40 microns and was characterized by an average pore diameter of 0.75 micron, a porosity of 91%, a water entry pressure of 3,000 mmH$_2$O, an air permeability of 10 sec/100.cc sheet, a tensile strength at break of 179 Kg/cm$^2$ and a strength factor F of 4.0. The porous membrane was so strong that the stress corresponding to 5% deformation under tension was 54 Kg/cm$^2$ (the modulus factor F' was 0.68). The quantity of deformation after 100 hours' standing under a strength corresponding to 5% of the stress at break was 2.5% and the quantity of deformation after removal of the load was 1%.

EXAMPLE 6

This example illustrates the application of the porous membrane as a plasma-separating membrane.

A porous membrane of propylene having a thickness of 35 microns, an average pore size of 0.5 micron, a porosity of 88% and an air permeability of 10 sec/100.cc sheet was prepared in the same manner as described in Example 1. The membrane was treated with a 20% solution of glycerin in ethanol and was then dried to evaporate ethanol. The glycerin-treated membrane was gripped by two plates, each having formed therein 36 grooves having a width of 1.5 cm, a length of 27 cm and a depth of 0.5 mm to form a plane membrane type module having a membrane area of 1,460 cm$^2$. The module was washed with a physiological saline solution to remove glycerin therefrom, and fresh bovine blood having a hematocrit value of 48% and a total protein level of 8 g/dl was caused to flow at a rate of 50 ml/min under a pressure of 80 mmHg on the top face side of the membrane. A transparent liquid flowed out at a rate of 12 ml/min from the lower face side of the membrane. The amount of the transparent liquid collected for 30 minutes was 360 ml. The total protein level of the transparent liquid was 8 g/dl as in the starting blood. It was found that all of the plasma proteins were allowed to pass through the membrane but all of the blood cell components were rejected. Thus, it was confirmed that the membrane was very excellent as a plasma-separating membrane.

EXAMPLE 7

This example illustrates the application of the porous membrane as a separator fitted in an alkaline battery.

A porous membrane of polypropylene having a thickness of 30 microns, a porosity of 91% and an average pore diameter of 0.5 micron was prepared in the same manner as described in Example 1. The strength factor F and modulus factor F' of this porous membrane were 5.2 and 0.54, respectively.

The porous membrane was dipped in an 8% solution of a nonionic surface active agent having an HLB value of 7.9 in ethanol and was then dried to render the membrane hydrophilic. The electric resistance of the membrane was 0.06 mΩ-dm$^2$/sheet as measured in an aqueous solution of potassium hydroxide having a specific gravity of 1.30. When the membrane was immersed in the above alkaline aqueous solution for one month, the weight change ratio was 0.5% and the areal change ratio was 1.5%.

An open type sintered Ni-Cd battery (having a capacity of 10 AH) was prepared by using the above membrane, and supercharging of 140% was effected. Subsequently, the battery was subjected to a 50-A rapid discharge test at 20° C. The obtained results are shown in Table 3, below, from which it is seen that the voltage reduction in this battery was smaller than in a conventional battery including a cellophane membrane.

TABLE 3

|  | Porous Membrane Present Invention | Cellophane Membrane* |
| --- | --- | --- |
| Initial voltage (V) | 1.633 | 1.628 |
| Voltage (V) at 80% discharge | 1.057 | 1.045 |
| Voltage (V) at 90% discharge | 1.042 | 1.025 |
| Voltage (V) at 100% discharge | 1.018 | 0.995 |
| Voltage (V) at 110% discharge | 0.973 | 0.912 |

Note
*Pudo #134 (36 microns) supplied by Du Pont

EXAMPLE 8

This example illustrates the application of the porous membrane as a microfilter.

A porous membrane having a thickness of 20 microns, a porosity of 85% and an average pore diameter of 0.35 micron was prepared in the same manner as described in Example 1.

The N$_2$ gas permeability of the membrane was 490 m$^3$/m$^2$.hr.110 mmHg, and the methanol permeability of the membrane was 21,600 l/m$^2$.hr.atm. Thus, it was confirmed that the porous membrane was excellent in the permeation characteristics.

The porous membrane was wetted with methanol and the methanol was substituted by water. Distilled water having incorporated therein 1,000 ppm of a polystyrene latex uniform in the particle size (marketed under the trade name of "Uniform Latex Particles" by Dow Chemical Co.) was filtered by the so-treated porous membrane, and the particle-trapping ratio was determined according to the following formula:

$$\text{Particle-trapping ratio} = [(CF - CD)/CF] \times 100$$

wherein CF stands for the latex concentration in the starting liquid and CP stands for the latex concentration in the filtrate.

The obtained results are shown in Table 4, below

TABLE 4

| Average Particle Size (micron) | Standard Deviation (micron) | Particle-trapping Ratio (%) |
|---|---|---|
| 0.038 | 0.0075 | 2 |
| 0.109 | 0.0027 | 5 |
| 0.220 | 0.0065 | 17 |
| 0.312 | 0.0022 | 99 |
| 0.481 | 0.0018 | 100 |
| 0.620 | 0.0076 | 100 |
| 0.804 | 0.0048 | 100 |

EXAMPLE 9

This example illustrates the application of the porous membrane to a waterproof air-permeable cloth.

A porous membrane of polypropylene having a thickness of 20 microns, a porosity of 78%, an average pore diameter of 0.35 micron and an air permeability of 7 sec/100 cc sheet was prepared in the same manner as described in Example 1. A polyamide hot melt adhesive was applied in 0.4-mm spots at a density of 190 spots/cm$^2$ to a woven fabric (taffeta) of nylon having a base weight of 86 g/m$^2$ and to a tricot knitted fabric of nylon having a base weight of 77 g/m$^2$. The porous membrane was sandwiched between the nylon taffeta and the nylon tricot knitted fabric. The assembly was subjected to thermal adhesion by using rolls heated at 140° C. under a pressure of 3 bars.

The so-obtained laminate was characterized by an air permeability of 15 sec/100 cc sheet, a water entry pressure of 6,000 mmH$_2$O and a water vapor permeability of 3 Kg/m$^2$ day. When the laminate was washed at 40° C. by using a neutral detergent, wrinkles were not formed at all, and the tensile strength was 50 kg/2.5 cm the width.

We claim:

1. A thermoplastic resin porous membrane which is formed of a thremoplastic resin having a critical surface tension of from 20 to 33 dyn/cm and having a three-dimensional network structure wherein communicating pores having a porosity of at least 60% and an average pore diameter of 0.1 to 2.0 microns are formed; the porous membrane having a strength factor F defined by the following formula (1):

$$F = A/(B(1-\alpha)) \quad (1)$$

wherein A stands for the tensile strength at break of the porous membrane, B stands for the tensile strength at break of a non-porous film formed of the same resin and α stands for the porosity fraction of the porous membrane, of at least 1 as measured in any direction, a modulus factor F' defined by the following formula (2):

$$F' = C/(D(1-\alpha)) \quad (2)$$

wherein C stands for the tensile stress of the porous membrane at 5% deformation, D stands for the tensile stress of a non-porous film formed of the same resin at 5% deformation and α stands for the porosity fraction of the porous membrane, of at least 0.2 as measured in any direction; a maximum pore diameter not larger than 3.25 times the average pore diameter and a thickness of from 5 to 500 microns.

2. A thermoplastic resin porous membrane as set forth in claim 1, wherein the quantity of deformation caused when the membrane is subjected to a tensile stress corresponding to 5% of the tensile stress at break of the porous membrane at 20° C. for 100 hours is not more than 15%, and the quantity of residual deformation after removal of said tensile stress is not larger than 5%.

3. A thermoplastic resin porous membrane as set forth in claim 1, wherein the areal shrinkage at a temperature of 50° C. lower than the melting or softening point of the thermoplastic resin is not larger than 5%.

4. A thermoplastic resin porous membrane as set forth in claim 1, wherein the thermoplastic resin is high density polyethylene.

5. A thermoplastic resin porous membrane as set forth in claim 1, wherein the thermoplastic resin is polypropylene.

6. A thermoplastic resin porous membrane as set forth in claim 1, wherein the thermoplastic resin is polyvinylidene fluoride.

7. A thermoplastic resin porous membrane as set forth in claim 1, wherein the thermoplastic resin is an ethylene/tetrafluoroethylene copolymer.

* * * * *